United States Patent
Fossum et al.

(10) Patent No.: US 6,628,281 B1
(45) Date of Patent: Sep. 30, 2003

(54) METHOD AND SYSTEM FOR COMPUTING THE INTERSECTION OF A BOUNDING VOLUME AND SCREEN-ALIGNED PLANE

(75) Inventors: Gordon C. Fossum, Austin, TX (US); Bruce D'Amora, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,817

(22) Filed: Feb. 24, 2000

(51) Int. Cl.[7] .................................................. G06T 15/40

(52) U.S. Cl. ..................................... 345/422; 345/424

(58) Field of Search .............................. 345/419, 420, 345/421, 423, 424, 426, 422, 441, 443, 620, 589, 582, 428, 622

(56) References Cited

U.S. PATENT DOCUMENTS

| | | | | |
|---|---|---|---|---|
| 5,113,490 A | * | 5/1992 | Winget ........................ | 345/419 |
| 5,574,835 A | * | 11/1996 | Duluk et al. ................. | 345/421 |
| 5,630,039 A | * | 5/1997 | Fossum ....................... | 345/423 |
| 6,285,779 B1 | * | 9/2001 | Lapidous et al. ............ | 345/422 |
| 6,480,205 B1 | * | 11/2002 | Greene et al. .............. | 345/427 |

OTHER PUBLICATIONS

Angel (Interactive Computer Graphics: A top–down Approach: 1997: ISBN 0–201–85571–2).*

* cited by examiner

*Primary Examiner*—Mano Padmanabhan
(74) *Attorney, Agent, or Firm*—Duke W. Yee; Mark E. McBurney; Stephen J. Walder, Jr.

(57) ABSTRACT

Apparatus and methods are provided to perform volume rendering via composited texture-mapped convex polyhedra. This is accomplished by generating a sequence of z polygons defined by the intersection of a sequence of z planes parallel to the view plane with the convex polyhedron. The vertices of the convex polyhedron are numbered sequentially based on z-axis depth and this defines a sequence of slabs that are bounded by z planes intersecting the vertices. The edges of the convex polyhedron are numbered based on viewing the polyhedron along an axis from the closest vertex to the furthest vertex. A data structure maintains a list of active edges for each slab, where an edge is "active" if the edge intersects any z plane in the slab. Each vertex in the z polygon is defined by the intersection of an active edge with the z plane. The z polygon is rendered by connecting adjacent vertices, where the ordering is determined by the order of the active edges in the slab. Each edge of the z polygon can be rendered by performing only three multiplications, two additions, and one subtraction. These computationally efficient methods make volume rendering via texture mapping feasible.

36 Claims, 8 Drawing Sheets

FIG. 3A

FRONT — INCREASING Z DEPTH — BACK

| SLAB | ACTIVE EDGES |
|------|--------------|
| 0 | 0, 4, 8 |
| 1 | 1, 4, 8, 11 |
| 2 | 1, 3, 5, 8, 11 |
| 4 | 2, 5, 7, 9, 11 |
| 5 | 2, 5, 7, 10 |
| 6 | 2, 6, 10 |

*FIG. 4C*

| SLAB | ACTIVE EDGES |
|------|--------------|
| 1 | 1, 4, 8, 11 |
| 3 | 2, 5, 8, 11 |
| 5 | 2, 5, 7, 10 |

*FIG. 4D*

| SLAB | ACTIVE EDGES |
|------|--------------|
| 1 | 1, 4, 8, 11 |
| 5 | 2, 5, 7, 10 |

*FIG. 4E*

| SLAB | ACTIVE EDGES |
|---|---|
| 0 | 0, 4, 8 |
| 3 | 2, 3, 5, 7, 9, 11 |
| 6 | 2, 6, 10 |

*FIG. 4F*

| SLAB | ACTIVE EDGES |
|---|---|
| 3 | 2, 5, 8, 11 |

```
struct {
    float startx;
    float starty;
    float delx;
    float dely;
    float startz;
    float recipz;
} e_array[12];
```

FIG. 9

```
e_array[ 0].startx = v[0][0];
e_array[ 0].starty = v[0][1];
e_array[ 0].delx   = v[1][0] - v[0][0];
e_array[ 0].dely   = v[1][1] - v[0][1];
e_array[ 0].startz = v[0][2];
e_array[ 0].recipz = 1.0/(v[1][2] - v[0][2]);
```

FIG. 10

```
int active_edge[7][12] = { {1,0,0,0,1,0,0,0,1,0,0,0},
                           {0,1,0,0,1,0,0,0,1,0,0,1},
                           {0,1,0,1,0,1,0,0,1,0,0,1},
                           {0,0,0,0,0,0,0,0,0,0,0,0},
                           {0,0,1,0,0,1,0,1,0,1,0,1},
                           {0,0,1,0,0,1,0,1,0,0,1,0},
                           {0,0,1,0,0,0,1,0,0,0,1,0} };

int middle_6[12] = {0,1,0,1,0,1,0,1,0,1,0,1};
int middle_4[12] = {0,0,1,0,0,1,0,0,1,0,0,1};
```

FIG. 11

```
int *edgeflagptrs[7] = {
    active_edge[0],
    active_edge[1],
    active_edge[2],
    NULL,
    active_edge[4],
    active_edge[5],
    active_edge[6],
};
```

FIG. 12

```
if (v[3][2] < v[4][2]) {
    edgeflagptrs[3] = middle_6;
}
else {
    edgeflagptrs[3] = middle_4;
}
```

FIG. 13

```
if (z <= v[0][2]) return;
if (z >= v[7][2]) return;
```

FIG. 14

```
if (z < v[4][2] || z < v[3][2]) {
    if (z < v[2][2]) {
        if (z < v[1][2]) slab = 0;
        else slab = 1;
    }
    else {
        if (z < v[4][2] && z < v[3][2]) slab = 2;
        else slab = 3;
    }
}
else {
    if (z < v[6][2]) {
        if (z < v[5][2]) slab = 4;
        else slab = 5;
    }
    else slab = 6;
}
```

FIG. 15

```
edgeflaglist = edgeflagptrs[slab];

glBegin(GL_LINE_LOOP);
for (i=0, i<12; ++i) if (edgeflaglist[i]) {
    float t = (z - e_array[i].startz) * e_array[i].recipz;
    glVertex3f(e_array[i].startx + t * e_array[i].delx,
               e_array[i].starty + t * e_array[i].dely,
               z);
}
glEnd();
```

FIG. 16

METHOD AND SYSTEM FOR COMPUTING THE INTERSECTION OF A BOUNDING VOLUME AND SCREEN-ALIGNED PLANE

BACKGROUND OF THE INVENTION

1. Technical Field

The present invention relates generally to an improved data processing system and in particular to a method and a system for improving display of three dimensional objects. Still more particularly, the present invention provides a method to calculate the intersection of a bounding volume with a plane parallel to the front of the screen at a specified depth.

2. Description of the Related Art

Realistic 3D rendering of images is critically important in many computer applications. Volume rendering via texture mapping requires the calculation of the intersection of a series of screen-aligned planes with a bounding volume. This volume rendering is accomplished by computing which halfspace of each side of the bounding volume a vertex of a polygon lies and then computing the intersection of the planes which lie in the inner halfspaces of the bounding volumes. The problem of computing the intersection of a plane with a bounding volume with the least computationally expensive algorithm is key to determining the set of polygons that must be texture mapped and composited in the graphics frame buffer to render volumetric data.

Therefore, it would be advantageous to have a method and system to minimize the floating point computation needed to perform volume rendering via texture mapping.

SUMMARY OF THE INVENTION

Apparatus and methods are provided to perform volume rendering via composited texture-mapped convex polyhedra. This is accomplished by generating a sequence of z polygons defined by the intersection of a sequence of z planes parallel to the view plane with the convex polyhedron. The vertices of the convex polyhedron are numbered sequentially based on z-axis depth and this defines a sequence of slabs that are bounded by z planes intersecting the vertices. The edges of the convex polyhedron are numbered based on viewing the polyhedron along an axis from the closest vertex to the furthest vertex.

A data structure maintains a list of active edges for each slab, where an edge is "active" if the edge intersects any z plane in the slab. Each vertex in the z polygon is defined by the intersection of an active edge with the z plane. The z polygon is rendered by connecting adjacent vertices, where the ordering is determined by the order of the active edges in the slab. Each edge of the z polygon can be rendered by performing only three multiplications, two additions, and one subtraction. These computationally efficient methods make volume rendering via texture mapping feasible.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
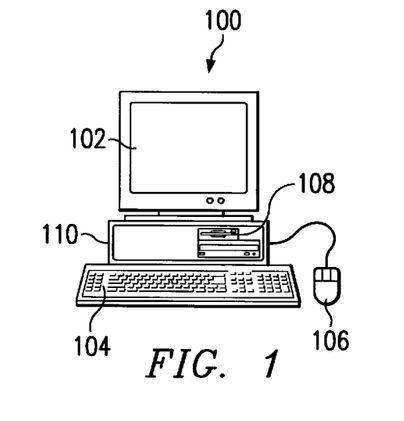
FIG. 1 is an exemplary pictorial representation depicting a data processing system in which the present invention may be implemented.

FIG. 1 is an exemplary pictorial representation depicting a data processing system in which the present invention may be implemented. As shown in FIG. 1, the data processing system may be a computer 100 that includes system unit 110, display 102, keyboard 104, storage devices 108, which may include floppy drives and other types of permanent and removable storage media, and pointing device 106. Additional input and output devices may be included with computer 100, as is readily understood by one of ordinary skill in the art. Computer 100 can be implemented as any suitable computer, such as an IBM Aptiva™ computer, a product of International Business Machines Corporation, or another type of data processing system, such as a networked workstation, mainframe computer, and the like. Computer 100 may also include a graphical user interface that may be implemented by means of systems software residing in computer readable media in operation within computer 100.

The present invention discloses a method and system to determine the intersection of a screen-aligned plane, aligned with the front of display 102, with a bounding volume in the image to be displayed. Given the orientation of computer 100 in FIG. 1, a screen-aligned plane is parallel to the page of print.

Figure 2:
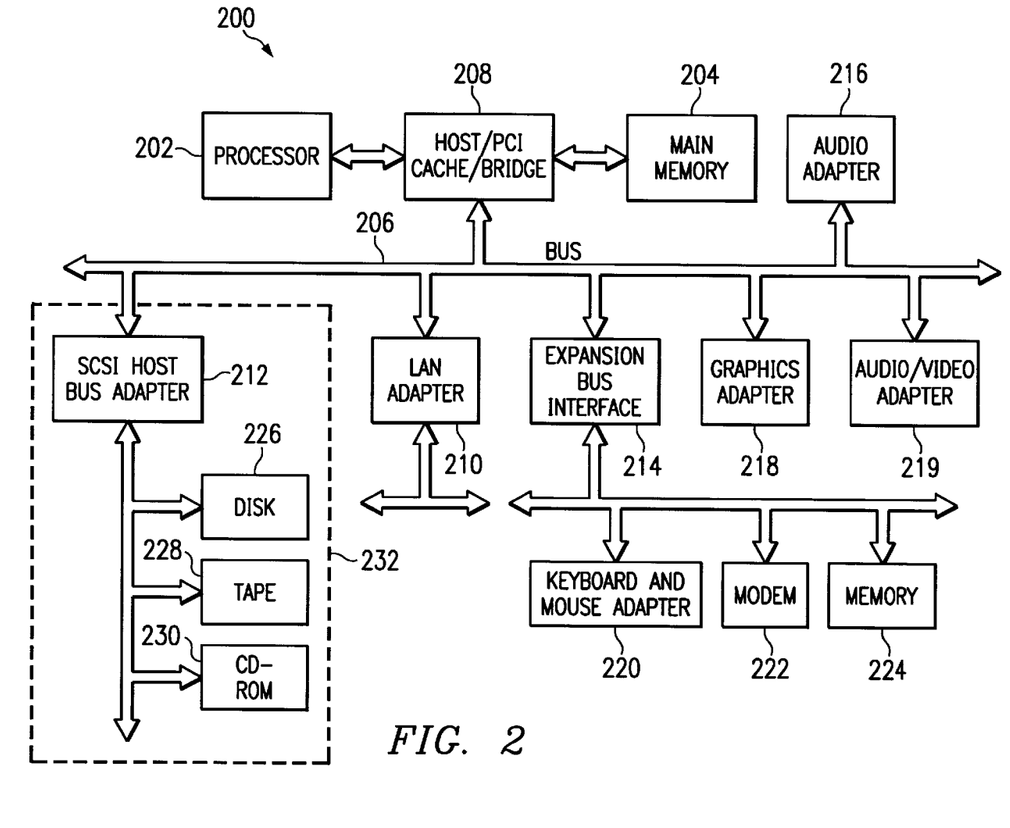
FIG. 2 is an exemplary block diagram illustrating a data processing system in which the present invention may be implemented.

FIG. 2 is an exemplary block diagram illustrating a data processing system 200 in which the present invention may be implemented. Data processing system 200 may be a computer, such as computer 100 in FIG. 1, in which code or instructions implementing the method of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as AIX (Advanced Interactive eXecutive), which is available from International Business Machines Corporation. Instructions for the operating system, applications or programs are located on storage devices, such as hard disk drive 226, and may be loaded into main memory 204 for execution by processor 202.

Those of ordinary skill in the art will appreciate that the hardware in FIG. 2 may vary depending on the implementation. For example, the processes of the present invention may be applied to a multiprocessor data processing system.

Data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. The depicted example in FIG. 2 and above-described examples are not meant to imply architectural limitations.

In particular, the planes are screen-aligned, the bounding volume is always a parallelepiped, and the Z position of each plane is predictable, a priori.

The present invention improves the performance of graphics adapter 216 by calculating the intersection of a bounding volume and a screen-aligned plane in an efficient manner. In particular, the method and system will draw the "z polygon" formed by a z plane intersecting a parallelepiped. Depending on orientation, a nontrivial z polygon will have from three to six edges. Using this invention, each edge of the z polygon can be drawn using three multiplications, two additions, and one subtraction.

Figure 3A:
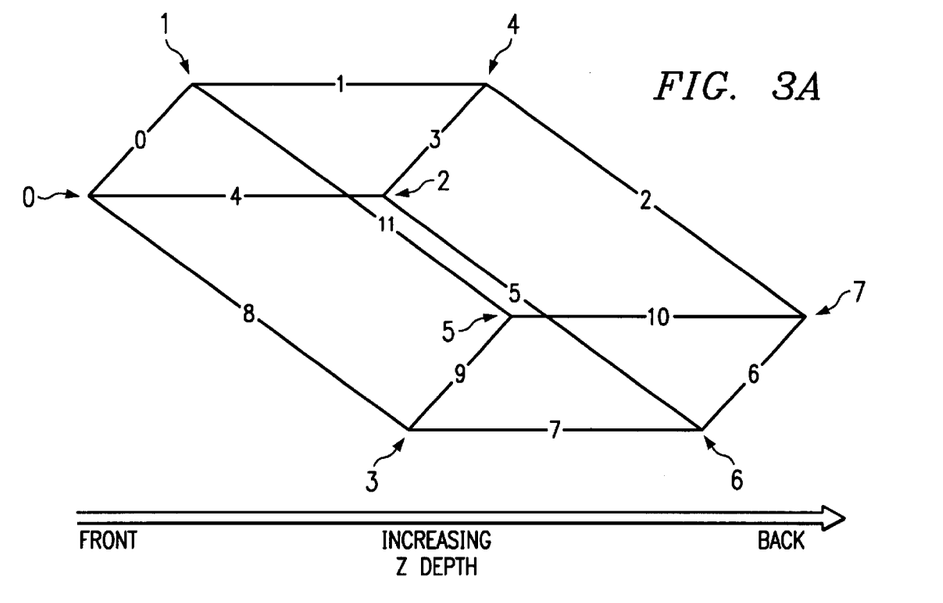
FIG. 3A is an exemplary drawing of a parallelepiped illustrating the numbering scheme for vertices and edges relative to the front of a display, in accordance with a preferred embodiment of the invention.

FIG. 3A is an exemplary drawing of a parallelepiped illustrating a numbering scheme for the eight vertices and twelve edges relative to the front of the screen. The vertices are numbered 0 through 7 with 0 being the leftmost vertex closest to the "front" of the screen, i.e., the display, and 7 being the rightmost vertex furthest from the front of the screen. The intermediate vertices 1 through 6 are numbered sequentially according to their positions in a left to right orientation, so vertex 1 is the second closest to the front of the screen and so forth. The edge numbers 0 through 11 appear near the midpoint of the respective edges.

Figure 3B:
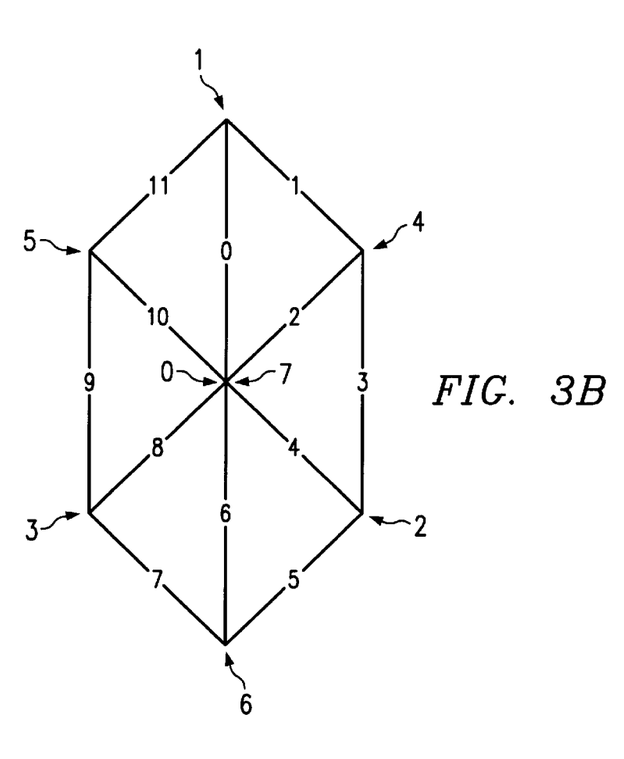
FIG. 3B is an exemplary drawing from a different perspective of a parallelepiped showing the symmetry of the edge numbering, in accordance with a preferred embodiment of the invention.

FIG. 3B is an exemplary drawing from a different perspective of a parallelepiped which makes the numbering scheme of the edges more apparent. In this special case, vertices 0 and 7 are on a line which is parallel to the Z axis, and the viewing perspective is on that line. With this view, it becomes clear why the edges are ordered the way they are. The edges proceed around the axis formed by vertex 0 and vertex 7 in a clockwise fashion; however, a counterclockwise ordering may also be used. No matter where a slicing plane intersects this parallelepiped, the resulting intersection polygon will be pierced by a line from vertex 0 to vertex 7. It follows that the vertices of the polygon, residing on the selected, affected edges, can be drawn in ascending order of these edges. The resulting polygon's edges are guaranteed to lie on the faces of the parallelepiped, instead of traversing the interior, as could happen with an improper ordering of the intersection polygon's vertices.

Figure 4A:
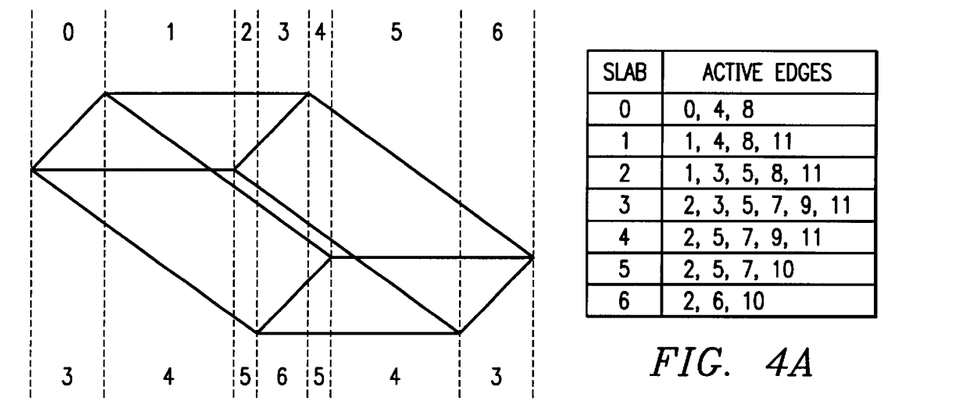
FIG. 4A is an exemplary diagram illustrating a parallelepiped structure for a non-degenerate case with 6 active edges for the middle slab, in accordance with a preferred embodiment of the invention.
Figure 4B:
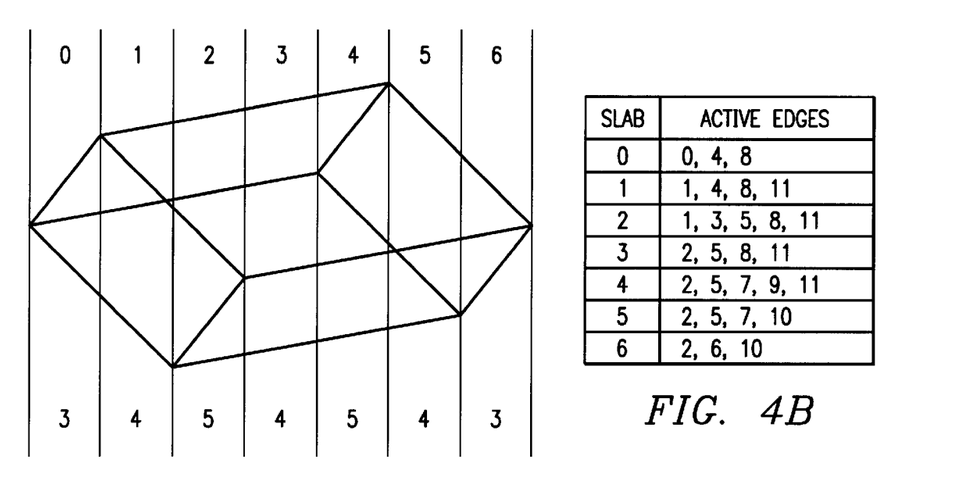
FIG. 4B is an exemplary diagram illustrating a parallelepiped structure for a non-degenerate case with 4 active edges for the middle slab, in accordance with a preferred embodiment of the invention.
Figure 4C:
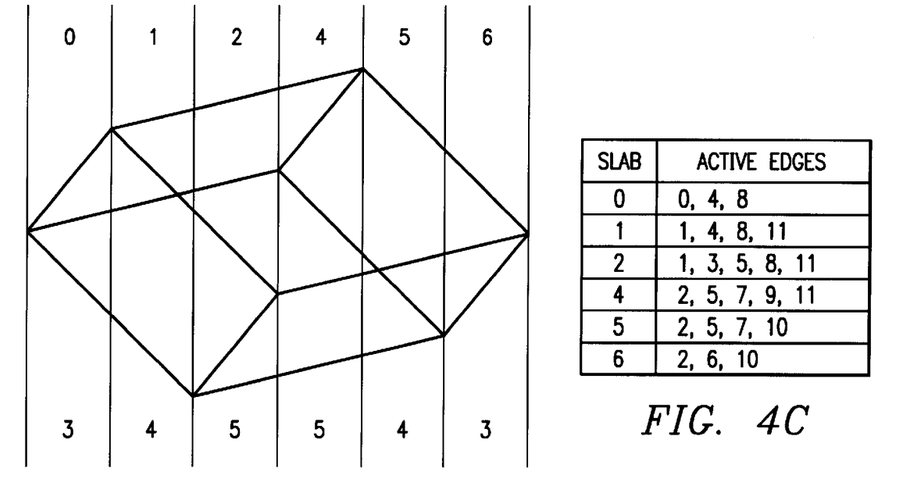
FIG. 4C is an exemplary diagram illustrating a parallelepiped structure for a degenerate case where the fourth slab disappears, due to one or more z planes containing multiple vertices.

With reference now to FIGS. 4A through 4G, a sequence of seven drawings is provided to illustrate different instances of vertex depth for the eight vertices in a parallelepiped. FIGS. 4A and 4B are "non-degenerate" cases where each of the eight vertices is at a distinct depth from the front of the screen. The main problem with the "non-degenerate" cases is to distinguish which of the two depicted cases is currently applicable. FIGS. 4C through 4G are "degenerate" cases where two or more vertices lie at the same vertex depth from the front of the screen. The invention disclosed here ensures proper treatment of these special "degenerate" cases.

FIG. 4A is an exemplary diagram illustrating a parallelepiped structure depicted in FIG. 3A with vertical lines drawn at each distinct vertex depth. For clarity the vertex numbers and edge numbers have been omitted. Since, in this case, each vertex is at a unique depth, eight distinct vertical lines are drawn. This defines seven sections or "slabs", numbered 0 through 6 at the top of the diagram. Each slab defines a set of planes that intersect a fixed number of edges in the parallelepiped. For example, a plane in slab 0 will intersect exactly 3 edges. Specifically, these edges are numbered 0, 4, and 8, so for any plane in slab 0, the active edges are 0, 4, and 8. This data is entered in the table below the figure. Slabs 2 and 3 contain planes that intersect exactly 4 and 5 edges, respectively. The corresponding active edges are listed in the table. By way of symmetry, slabs 4, 5, and 6 intersect exactly 5, 4, and 3 edges, respectively, and the active edges are given in the table. The middle slab intersects exactly 6 edges, as listed in the active edge table. The number of edges intersected by planes in each slab appears below the figure. For this non-degenerate case, this sequence of numbers is (3, 4, 5, 6, 5, 4, 3).

FIG. 4B is an exemplary diagram illustrating a only other non-degenerate case where each of the eight vertices is at a unique depth. Again, there are seven slabs and the number of edges intersected by planes in each slab appears below the figure and the active edges are listed in the table. The numbers for the intersections of this parallelepiped are (3, 4, 5, 4, 5, 4, 3). These values and the active edges in the table are identical to those in FIG. 4A, except for the middle slab #3. The non-degenerate cases are fully characterized once it is known whether planes in slab #3 intersect 4 or 6 edges. This is determined by identifying whether vertex 3 is closer to the front of the screen than vertex 4, as is the case for the parallelepiped in FIG. 4A, or whether vertex 4 is closer to the front of the screen than vertex 3, as is the case for the parallelepiped in FIG. 4B.

The next five parts of FIG. 4 illustrate "degenerate" parallelepipeds where two or more vertices have the same distance from the front of the screen. In FIG. 4C, slab 3 has "disappeared" since the vertices that defined the left and right boundaries of the slab are at the same depth. The number of edges intersected by planes in each slab, omitting slab #3, are (3, 4, 5, 5, 4, 3), and the active edges are shown in the table below the figure.

Figure 4D:
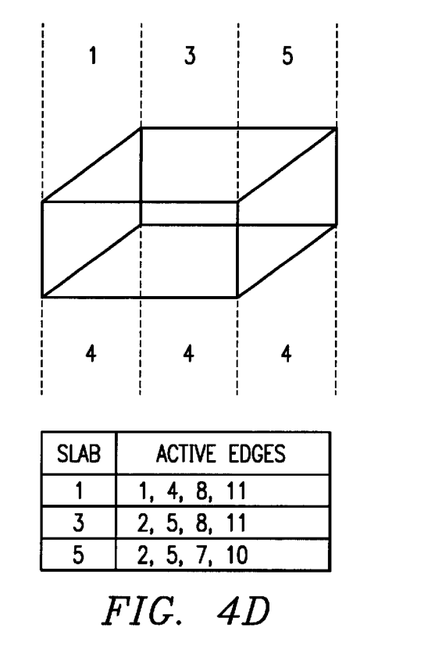
FIG. 4D is an exemplary diagram illustrating a parallelepiped structure for a degenerate case where the first, third, fifth, and seventh slabs disappear, due to one or more z planes containing multiple vertices.

In FIG. 4D, slabs 0, 2, 4, and 6 have disappeared due to the alignment of two vertices at each of four depths. The number of edges intersected by the remaining slabs 1, 3, and 5 is exactly 4 in each case. The active edges for each of these slabs are shown in the table below the figure.

Figure 4E:
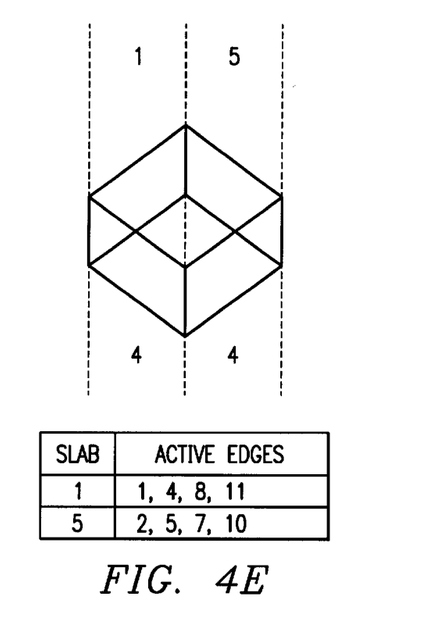
FIG. 4E is an exemplary diagram illustrating a, parallelepiped structure for a degenerate case where the first, third, fourth, fifth, and seventh slabs disappear, due to one or more z planes containing multiple vertices.

In FIG. 4E, slabs 2, 3, and 4 disappeared due to the alignment of four vertices at the middle depth. At the closest and furthest depths, two vertices are at the same depth resulting in slabs 0 and 6, respectively, disappearing. So only slabs 1 and 5 remain; planes in these two slabs intersecting exactly 4 edges, as listed in the table of active edges.

Figure 4F:
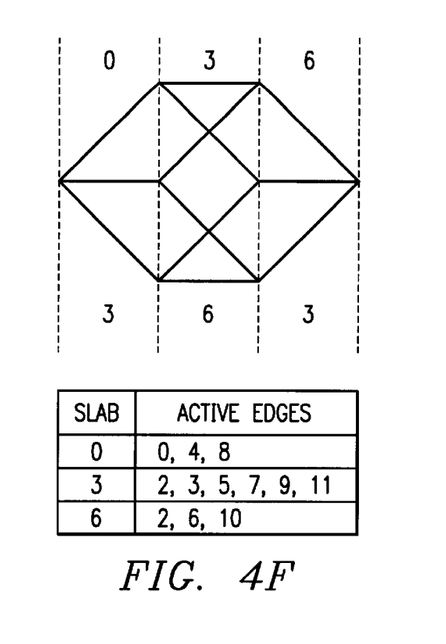
FIG. 4F is an exemplary diagram illustrating a parallelepiped structure for a degenerate case where the second, third, fifth, and sixth slabs disappear, due to one or more z planes containing multiple vertices.

The parallelepiped in FIG. 4F retains slab 0 due to the fact the "closest" vertex is at a unique depth and it also retains slab 6 due to the fact that the "furthest" vertex is at a unique depth. However, three vertices are at the same depth for the second closest depth resulting in slabs 1 and 2 disappearing. In a similar manner, the alignment of the next three vertices at the same depth cause slabs 4 and 5 to disappear. Only slabs 0, 3, and 6 remain with planes in these slabs intersecting exactly 3, 6, and 3 edges, respectively. The active edges for each of these slabs are shown in the table below the figure.

Figure 4G:
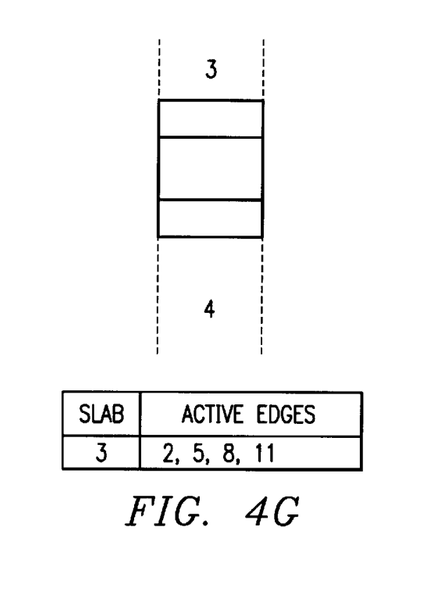
FIG. 4G is an exemplary diagram illustrating a parallelepiped structure for a degenerate case where the first, second, third, fifth, sixth, and seventh slabs disappear, due to one or more z planes containing multiple vertices.

The final special case, shown in FIG. 4G, is the most degenerate case possible. Four of the eight vertices are aligned at the closest plane, resulting in slabs 0, 1, and 2 disappearing. The other four vertices align at the second closest depth, resulting in slabs 4, 5, and 6 disappearing. Only slab 3 remains and any plane in this slab intersects exactly 4 edges, as shown in the table of active edges below the figure.

The seven cases shown in FIGS. 4A through 4G are the only possible combinations of distances of vertices from the front of the screen. As one of ordinary skill in the art will appreciate, it would be possible to draw parallelepipeds of different sizes and orientations, but if only the depths of the eight vertices are considered significant, then each parallelepiped will fall into one of these seven cases. The degenerate cases (FIGS. 4C–4G) all represent instances of one of the first two cases, with the special fact that one or more of the slabs will never be processed. Any intersecting plane that, in fact, touches a vertex, can be fed into any non-empty slab adjacent to that vertex, and the algorithm will correctly draw a z polygon. Thus, proper operation, even in degenerate cases, is assured.

Figure 4H:
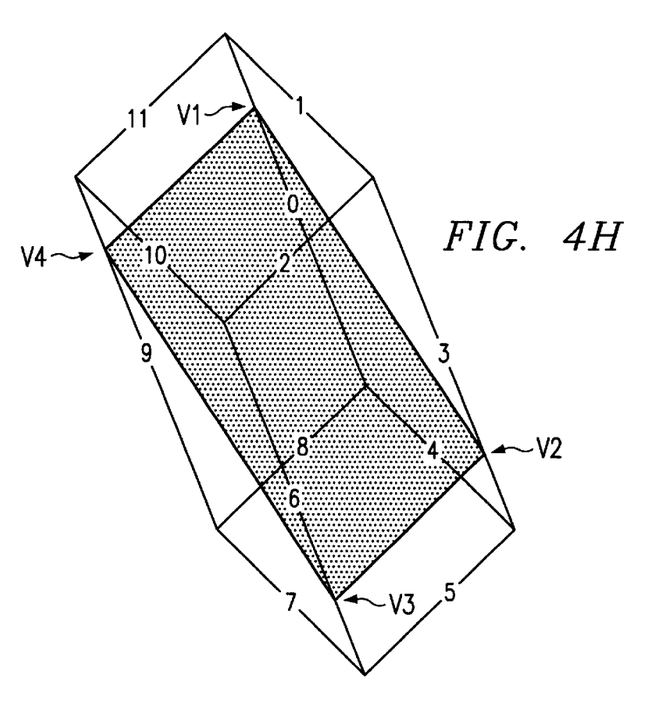
FIG. 4H is an exemplary diagram illustrating a z polygon is formed by a z plane slicing through a parallelepiped.

In FIGS. 4A–4G the plane of the screen is perpendicular to the page. This means that the z polygon formed by a z plane intersecting the parallelepiped cannot be seen clearly. FIG. 4H has a different orientation so that the z polygon formed by a z plane slicing through the parallelepiped is clearly visible. The edge numbers are shown from 0 through 11 at the midpoint of each of the twelve edges. The face formed by the edges 1, 2, 10, and 11 are closest to the front and the face formed by the edges 4, 5, 7, and 8 are furthest from the front. The slicing plane, shown in light gray, intersects four of the edges. In particular, the z polygon vertex labeled V1 lies on edge 0, the z polygon vertex labeled V2 lies on edge 3, the z polygon vertex labeled V3 lies on edge 6, and the z polygon vertex labeled V4 lies on edge 9. The z polygon is formed by connecting the z polygon vertices V1 through V4 and then back to the starting point, V1.

As seen by the numbering scheme for edges in FIG. 3B, the edges are ordered from edge 0 to edge 11 when proceeding in a clockwise fashion starting at the 12 o'clock position. So if the intersection of the z plane with the intersected edges are generated according to the order of the edge numbering, these will represent the vertices of the z polygon ordered such that if adjacent vertices are connected, the complete z polygon will be rendered.

Figure 5:
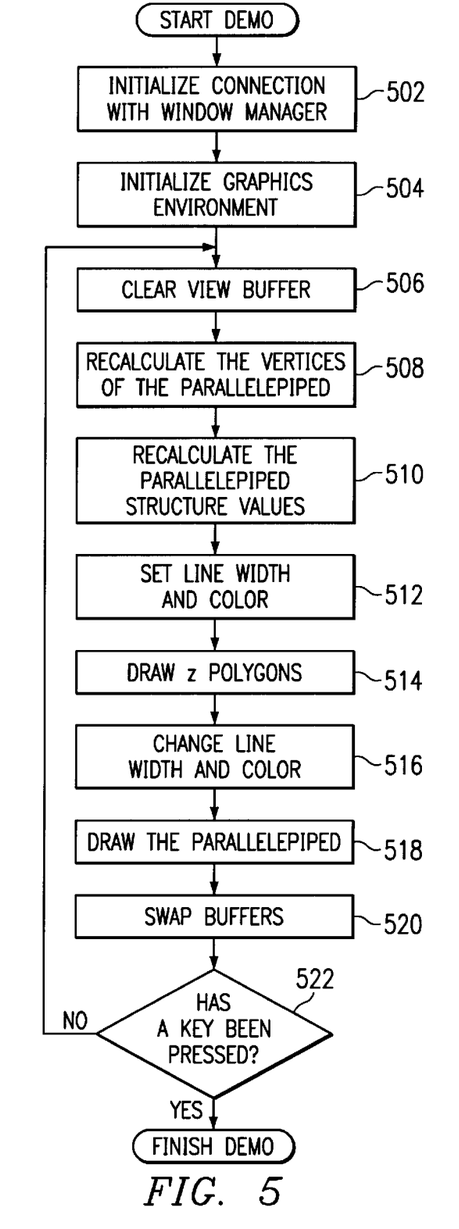
FIG. 5 is a flowchart outlining an exemplary operation for continually displaying and rotating a parallelepiped on a display, in accordance with a preferred embodiment of the invention.

FIGS. 5–8 are a series of flowcharts outlining exemplary operations of the present invention making use of the slab characteristics described above. FIG. 5 is a flowchart of an exemplary operation for continually displaying and rotating a parallelepiped until a user terminates the display. This operation performs three subroutines that are expanded as separate figures: recalculation of the vertices of the parallelepiped after rotation, shown in FIG. 6, recalculation of the parallelepiped structure values, shown in FIG. 7, and drawing of the z polygons, shown in FIG. 8.

With reference now to FIG. 5, a flowchart outlines an exemplary operation for continually displaying and rotating a parallelepiped on a display. As shown in FIG. 5, the operation starts with initialization of the window manager (step 502) and the graphics environment (step 504). An example window manager might be Motif and an example graphics environment might be OpenGL 3D graphics. As one of ordinary skill in the art will appreciate, other window managers, such as Microsoft Windows, and other graphics environments, such as DirectX, could be used to demonstrate the present invention. The graphics environment may use double buffering so that, as one buffer is being displayed, the values for the next image are being calculated in the second buffer. The buffers then switch roles and the, process is repeated.

The buffer is cleared (step 506) and the new positions of the eight vertices in the parallelepiped are recalculated based on the angle of rotation (step 508). The details of step 508 are found in FIG. 6. The structure values associated with the parallelepiped are recalculated (step 510). The details of this recalculation are given in FIG. 7. The line width and line color are set to a particular value (step 512) and the z polygons are drawn (step 514). The number and position of the z planes are application dependent. The details of drawing a single z polygon are given in FIG. 8; however, the operation shown in FIG. 8 may be repeated to draw multiple z polygons, as needed. The line width and line color are changed (step 516) so that when the parallelepiped is drawn (step 518), it appears as a separate object from the z polygons. Drawing the parallelepiped is a sequence of twelve draw commands for the twelve edges in the parallelepiped. The buffers are swapped (step 520) and there is a check if a key has been pressed. (step 522). If a key has been pressed (step 522: Yes), then the operation is terminated. If a key has not been pressed (step 522: No), then control returns to step 506 where the buffer is cleared and the process of rotating and drawing the parallelepiped and z polygons is repeated. As one of ordinary skill in the art will appreciate, alternative forms of user input, such as the pressing of a mouse button, might be used to terminate the operation.

Figure 6:
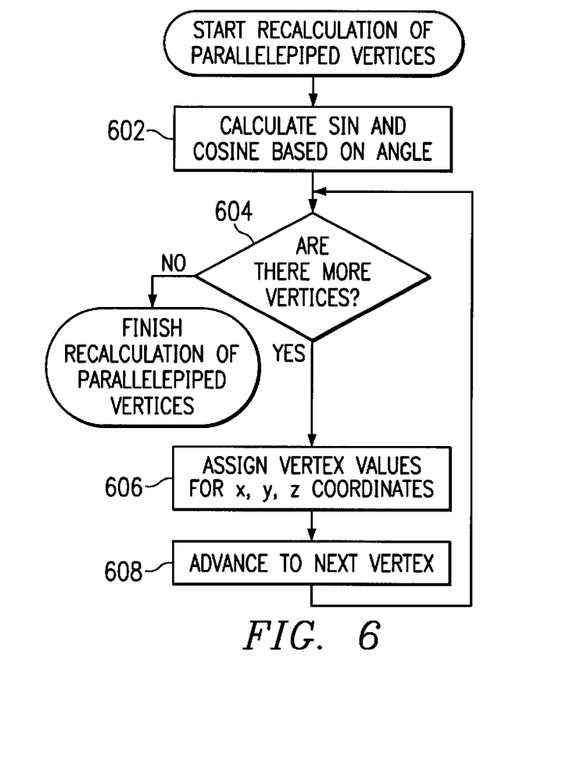
FIG. 6 is a flowchart outlining an exemplary operation for recalculating the positions of the parallelepiped vertices, in accordance with a preferred embodiment of the invention.

With reference now to FIG. 6, a flowchart shows the recalculation of the vertex positions after the parallelepiped has been rotated. The sine and cosine values for the particular angle of rotation are calculated (step 602). There is a determination if there are more vertex positions to be calculated (step 604). If there are more vertices to be processed (step 604: Yes), then the vertex values for each of the three coordinates, x, y, and z, are calculated and assigned to the vertex (step 606). The program advances to the next vertex (step 608), then repeats the determination whether or not there are more vertices to be processed and the assignment of vertex coordinates (steps 604 and 606). When there are no more vertices to be processed (step 604: No), the recalculation of vertex positions is finished.

Figure 7:
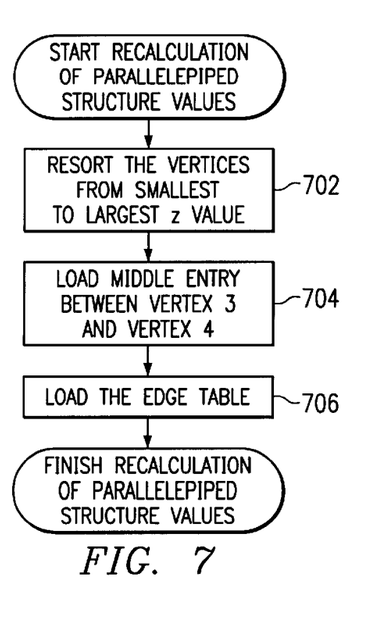
FIG. 7 is a flowchart outlining an exemplary operation for recalculating the parallelepiped structure values, in accordance with a preferred embodiment of the invention.

With reference now to FIG. 7, a flowchart shows an exemplary operation for recalculation of the parallelepiped structure values after the parallelepiped has been rotated. Each of the twelve edges of the parallelepiped has the following associated structure values: the starting x position, the starting y position, the change (or delta) in the x value from the start to the end position, the change (or delta) in the y value from the start to the end position, the starting z position, and the reciprocal of the change (or delta) in the z value from the start to the end position. Calculating the reciprocal of a number has the potential, in rare circumstances, of resulting in division by zero. Some number representations, such as the IEEE (Institute of Electrical and Electronics Engineers) 754 standard for floating point arithmetic, have representations for positive and negative infinity so that the result of a divide by zero can be stored. However, if a particular system produces a runtime divide by zero error, then this error will have to be disabled. Due to the fact that only the values for active edges are involved in calculating the z polygon, as will be seen in FIG. 8, there is no danger that any calculation will be performed using an infinite value produced by division-by-zero. The only variables which could contain the results of a division-by-zero would be contained within degenerate (and, therefore, inactive) edge structures. Therefore, these rare instances, when they do occur, can be ignored.

As shown in FIG. 3, the vertices are ordered based on the z depth, shown in a left to right orientation in this drawing. When the positions of the vertices are changed due to rotation of the parallelepiped (step 508 in FIG. 5), the relative z depths of the vertices may have been changed. Therefore, the vertices are resorted from the smallest to the largest z depth (step 702). As shown in FIGS. 4A and 4B, there are seven slabs defined by the eight vertices and the active edges for the first three slabs and the active edges for the last three slabs are the same for both of these cases. It is only the active edges for the middle slab that change. If vertex 3 is closer to the front than vertex 4, then there are six active edges: 1, 3, 5, 7, 9, and 11. If vertex 4 is closer to the front than vertex 3, then there are four active edges: 2, 5, 8, and 11. The z depths for vertices 3 and 4 determine which vertex is closer to the front and the active edges for this middle slab are loaded (step 704).

Now that all the active edges have been determined, the structural values for each edge, as listed earlier, are recalculated (step 706). This completes the recalculation of the structure values associated with the edges of the parallelepiped.

Figure 8:
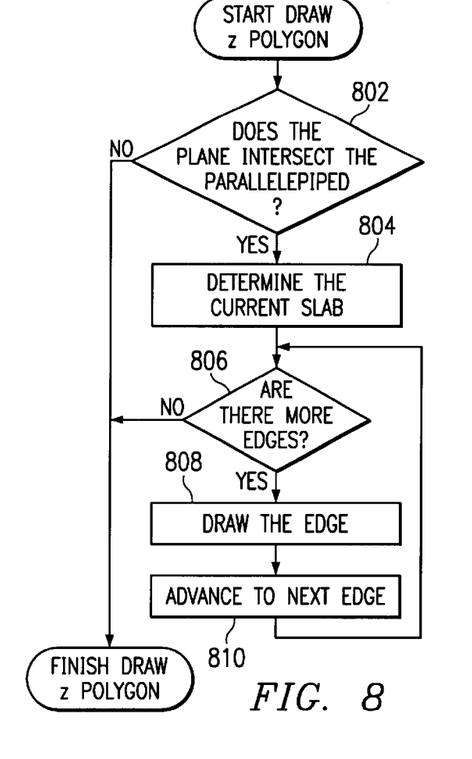
FIG. 8 is a flowchart outlining an exemplary operation for drawing a z polygon, in accordance with a preferred embodiment of the invention.

With reference now to FIG. 8, a flowchart shows an exemplary operation for drawing of a z polygon based on the intersection of a z plane with the parallelepiped. As is readily apparent to those of ordinary skill in the art, the operation in FIG. 8 may be repeated as many times as needed to draw a series of z polygons. The vertices of the z polygon are determined by the intersection of the z plane with the active edges for the current slab. It is first determined if the z polygon intersects the parallelepiped at all (step 802). If there is no intersection (step 802: No), then there is no z polygon to draw and the routine is finished. If the z plane lies between the closest and furthest vertex (step 802: Yes), then the current slab, numbered 0 through 6 in FIGS. 4A and 4B, is determined by the depth of the z plane relative to the z depth of the eight vertices (step 804).

Once the slab is determined, the set of active edges is known. It is determined if there are more active edges to be considered (step 806). If there are no more active edges (step 806: No), then drawing the z polygon is completed. If there are more active edges (step 806: Yes), then the intersection of the z plane with this active edge is determined. This determines a vertex in the z polygon so that the edge of the z polygon from the previous vertex to this new vertex can be drawn (step 808).

Rendering each edge of the z polygon requires exactly three multiplications, two additions, and one subtraction. The exact details of the data structures and calculations involved are shown in FIGS. 9–16 below, showing a preferred embodiment implemented using the C programming language. The next active edge is considered (step 810) and control transfers back to the determination if there are any more active edges (step 806). Eventually all of the active edges are processed resulting in the drawing of all the edges in the z polygon.

This invention is further illustrated by examining code fragments of an actual implementation in a preferred embodiment of the invention. This code is written in the C programming language and uses the OpenGL 3D graphics procedural interface. However, as one of ordinary skill in the art will appreciate, other programming languages, such as C++ or Java, and other graphics environments, such as DirectX or D3D, may be used without departing from the spirit and scope of the present invention.

Figure 9:
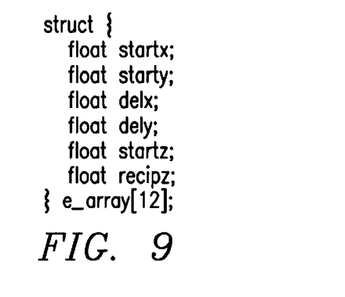
FIG. 9 shows a fragment of C code that defines an array of parallelepiped structure values, in accordance with a preferred embodiment of the invention.

A parallelepiped contains exactly twelve edges, so the edge array shown in FIG. 9 contains twelve entries. Each entry is a structure with six fields: the starting x position, the starting y position, the change (or delta) in the x value from the start to the end position, the change (or delta) in the y value from the start to the end position, the starting z position, and the reciprocal of the change (or delta) in the z value from the start to the end position. As will be shown below in FIG. 16, storing the reciprocal of the change in z value will simplify the rendering of the edge in the z polygon.

Figure 10:
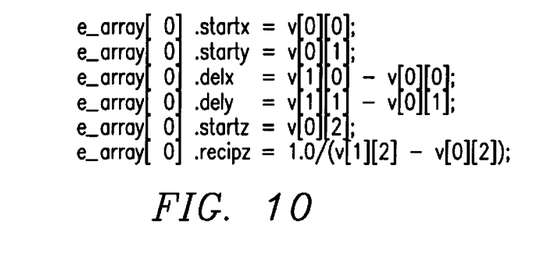
FIG. 10 shows a fragment of C code that assigns parallelepiped structure values for a first edge based on positions of the vertices, in accordance with a preferred embodiment of the invention.

The array of vertex values is a two dimensional array: the first dimension from 0 to 7 is the vertex number and the second dimension of 0, 1, and 2 is the x coordinate, y coordinate, and z coordinate, respectively. As seen in FIG. 3A, edge 0 connects vertex 0 and vertex 1. The assignment of values in the edge array for edge 0 is shown in FIG. 10. A similar set of assignment statements assigns values for the other eleven edges.

Figure 11:
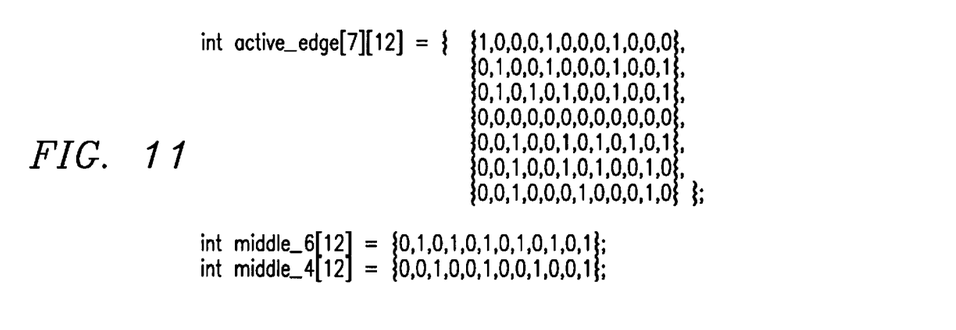
FIG. 11 shows a fragment of C code that assigns a set of active edges for each of seven regions defined by the eight vertices of a parallelepiped, in accordance with a.preferred embodiment of the invention.

As shown in FIGS. 4A and 4B, the eight vertices of a parallelepiped define seven slabs. Each of these seven slabs has an associated set of active edges from the twelve possible edges. The first three slabs and the last three slabs for these non-degenerate configurations contain the same sets of active edges; it is only the active edges for the middle slab that vary for these two cases. FIG. 11 shows one possible representation for this data structure. The variable active_edge is a two dimension array with the first index from 0 to 6, corresponding to the seven possible slabs, and the second index from 0 to 11, corresponding to the twelve candidate edges. The array entries are 0 and 1, where 0 means the edge is not active and 1 means the edge is active. For example, the entry active_edge[1][4] equals 1, so this means that edge 4 is active in slab 1. However, edge 5 is not active for slab 1 since active_edge[1][5] equals zero. The middle slab at index 3 is assigned all zero values since the correct set of values will not be known until the orientation of the parallelepiped is known. The two possible candidate sets of active edges are shown as the arrays middle_6, corresponding to FIG. 4A, and middle_4, corresponding to FIG. 4B.

Figure 12:
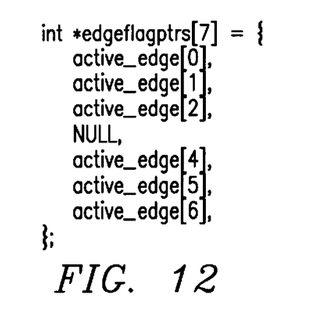
FIG. 12 shows a fragment of C code that defines a set of edge flag pointers for the seven regions, in accordance with a preferred embodiment of the invention.
Figure 13:
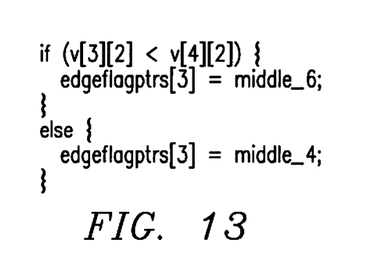
FIG. 13 shows a fragment of C code that determines an assignment of a middle region based on an orientation of vertices of a parallelepiped, in accordance with a preferred embodiment of the invention.

The declaration of edge flag pointers is shown in FIG. 12. The middle slab initially has a NULL value. As shown in FIG. 13, if vertex 3 is closer to the face of the screen than vertex 4, then the middle slab is assigned six active edges. If this is not the case, the middle slab is assigned four active edges.

As one of ordinary skill in the art will appreciate, other data representations for the set of active edges for each slab are possible. For example, the active edge array could be a two dimensional array with the first index representing slabs 0 through 6 and the second index 0 through 5 representing up to six active edges at the same time. The entries in the array would be the edge numbers for the active edges with a value of –1 indicating no edge is present. The first row of this array would be assigned the values (0, 4, 8, –1, –1, –1) indicating that only edges 0, 4, and 8 are active in the first slab at index 0. The key idea is that a data structure is maintained for the set of active edges based on the slab in which the z plane is contained.

Figure 14:
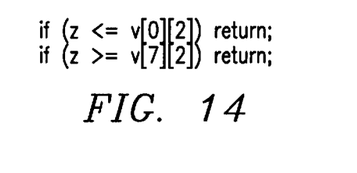
FIG. 14 shows a fragment of C code that exits drawing of a z polygon if a z plane does not intersect a parallelepiped, in accordance with a preferred embodiment of the invention.

The next critical operation, as illustrated by the flowchart in FIG. 8, is the drawing of the z polygon for the intersection of the given z plane with the parallelepiped. If the z plane does not intersect the parallelepiped (step 802: No), then there is nothing to draw. The corresponding code is shown in FIG. 14. Since the vertices are ordered with vertex 0 having the smallest z value and vertex 7 having the largest z value, if the z plane has a z value less than vertex 0 or greater than vertex 7, then the plane does not intersect the parallelepiped and the subroutine can be exited.

Figure 15:
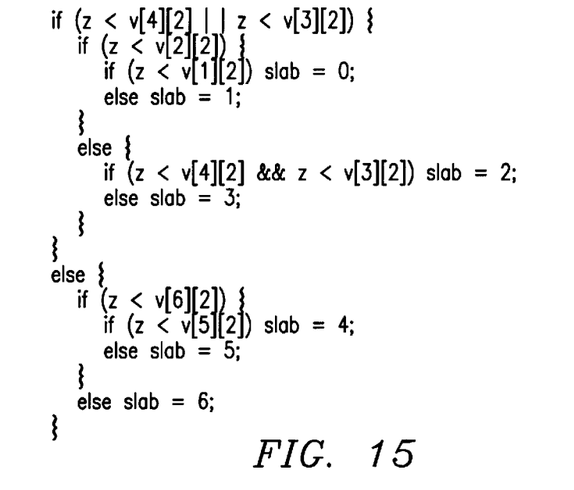
FIG. 15 shows a fragment of C code that determines a region based on a position of a z plane, in accordance with a preferred embodiment of the invention.

The code for determining the current slab (step 804 in FIG. 8) is shown in FIG. 15. Based on the code in FIG. 14, it is known that the plane intersects the parallelepiped. The slab number is determined once the vertex index for the vertex immediately behind the plane is known. For example, if vertex 4 is immediately behind the plane, then the plane is in slab 3. Since the vertices have been sorted, this test can be performed with nested if statements, as shown in FIG. 15.

Figure 16:
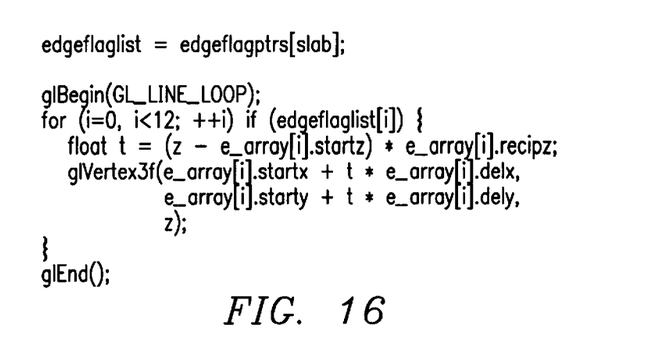
FIG. 16 shows a fragment of C code that draws a z polygon based on an intersection of a z plane with a current set of active edges, in accordance with a preferred embodiment of the invention.

With reference now to FIG. 16, a fragment of C code is shown that calculates and draws the z polygon. The slab to be processed has already been determined, as shown in FIG. 15, so the variable "edgeflaglist" is assigned the set of active edges. The for loop cycles through the twelve possible edges, but the if command, using the flag value in "edgeflaglist", insures that only active edges are processed. The assignment to the variable "t" involves one subtraction followed by one multiplication. There are three parameters in the call to the subroutine "glVertex3f." The calculation for each of the first two parameters involves one multiplication and one addition. There is no calculation for the third parameter. So the calculations to draw each edge of the z polygon involve three multiplications, two additions, and one subtraction. The number of edges actually drawn will vary from 3 to 6 based on the number of nonzero entries in the "edgeflaglist." As one of ordinary skill in the art will appreciate, this algorithm is independent of the particular programming language used or the particular graphics windowing system used. Also, a different data structure, such as the one described in the discussion of FIG. 11, might be used to store the set of active edges for each slab.

Because drawing each edge in a z polygon only requires three multiplications, two additions, and one subtraction, the calculations to render the entire z polygon are greatly reduced. Consequently, given the same amount of time for calculations, as determined by the frame rate, more z polygons can be drawn. This improves the volume rendering via texture mapping and produces more realistic three dimensional images.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for rendering a z polygon formed by an intersection of a screen-aligned plane with a bounding volume, the method comprising the computer-implemented steps of:

determining an ordered set of bounding volume edges intersected by the screen-aligned plane;

for the ordered set of bounding volume edges, calculating a corresponding ordered set of z polygon vertices, wherein each vertex in the ordered set of z polygon vertices is determined by the intersection of the screen-aligned plane with a corresponding edge from the ordered set of bounding volume edges; and rendering the z polygon by connecting the z polygon vertices of the ordered set of z polygon vertices in an order corresponding to the ordered set of z polygon vertices, wherein:

the bounding volume is a parallelepiped with eight vertices and twelve edges;

the eight vertices are sorted based on increasing z depth;

the parallelepiped has one of a first orientation and a second orientation;

each vertex of the parallelepiped is at a distinct z depth in either the first orientation or the second orientation; and a calculation to draw each edge of the z polygon requires only three multiplications, two additions, and one subtraction.

2. The method of claim 1, wherein each of the twelve edges is numbered sequentially, based on a relative position of an edge with a central axis.

3. The method of claim 2, wherein, the central axis is from a vertex with the smallest z depth to a vertex with the largest z depth, and the edges are numbered sequentially proceeding in a clockwise fashion.

4. The method of claim 2, wherein, the central axis is from a vertex with the smallest z depth to a vertex with the largest z depth, and the edges are numbered sequentially proceeding in a counterclockwise fashion.

5. The method of claim 1, wherein the eight ordered vertices define seven ordered regions of increasing z depth.

6. The method in claim 1, wherein the parallelepiped is in the first orientation if a fourth vertex from the set of ordered vertices has a smaller z depth than a fifth vertex from the set of ordered vertices.

7. The method in claim 1, wherein the parallelepiped is in the second orientation if a fourth vertex from the set of ordered vertices does not have a smaller z depth than a fifth vertex from the set of ordered vertices.

8. The method in claim 1, wherein a set of intersected edges for a region with a smallest z depth contains a first, fifth, and ninth edges from the set of ordered edges for either the first orientation or the second orientation.

9. The method in claim 1, wherein a set of intersected edges for a region with a second smallest z depth contains a second, fifth, ninth, and twelfth edges from the set of ordered edges for either the first orientation or the second orientation.

10. The method in claim 1, wherein a set of intersected edges for a region with a third smallest z depth contains a second, fourth, sixth, ninth, and twelfth edges from the set of ordered edges for either the first orientation or the second orientation.

11. The method in claim 1, wherein a set of intersected edges for a region with fourth the smallest z depth contains a third, fourth, sixth, eighth, tenth, and twelfth edges from the set of ordered edges for the first orientation.

12. The method in claim 1, wherein a set of intersected edges for a region with a fourth smallest z depth contains a third, sixth, ninth, and twelfth edges from the set of ordered edges for the second orientation.

13. The method in claim 1, wherein a set of intersected edges for a region with a fifth smallest z depth contains a third, sixth, eighth, tenth, and twelfth edges from the set of ordered edges for either the first orientation or the second orientation.

14. The method in claim 1, wherein a set of intersected edges for a region with a sixth smallest z depth contains a third, sixth, eighth, and eleventh edges from the set of ordered edges for either the first orientation or the second orientation.

15. The method in claim 1, wherein a set of intersected edges for a region with a seventh smallest z depth contains a third, seventh, and eleventh edges from the set of ordered edges for either the first orientation or the second orientation.

16. A method to perform volume rendering via texture mapping for a bounding volume, comprising:

ordering a plurality of vertices of the bounding volume;

ordering a plurality of edges of the bounding volume based on the ordering of the plurality of vertices;

identifying a plurality of slabs, based on the relative positions of the plurality of vertices;

identifying a plurality of active edges for each slab, wherein an active edge is an edge from the plurality of edges that is intersected by the slab;

ordering a plurality of vertices of a z polygon, wherein a vertex of a z polygon is defined by an intersection of an active edge and a view-plane-aligned plane in a slab;

rendering a plurality of edges of a z polygon, wherein an edge connects two consecutively ordered vertices of the z polygon; and performing volume rendering by rendering a series of z polygons, wherein rendering a plurality of edges of a z polygon requires three multiplications, two additions, and one subtraction for each edge.

17. The method of claim 16, wherein the bounding volume is a convex polyhedron.

18. The method of claim 17, wherein the convex polyhedron is a parallelepiped.

19. A method for displaying a bounding volume, comprising:

storing data in a memory representing the bounding volume;

generating additional data for display of the bounding volume; and using the additional data to render the bounding volume, wherein the additional data includes:

determining an ordered set of vertices of the bounding volume based of the data stored in the memory, determining an ordered set of edges of the bounding volume based on the ordered set of vertices, identifying a plurality of slabs based on relative positions of the ordered set of vertices, generating a sequence of z polygons based on intersections of the bounding volume with a sequence of view-plane-aligned planes in the plurality of slabs, and;

displaying the bounding volume based on volume rendering by displaying the sequence of z polygons, wherein generating the sequence of z polygons includes rendering a plurality of edges of the z polygons resulting from the sequence of view-plane-aligned planes intersecting the bounding volume, and wherein rendering each edge of the z polygons requires three multiplications, two additions, and one subtraction.

20. The method of claim 19, wherein the bounding volume displayed is a convex polyhedron.

21. The method of claim 20, wherein the convex polyhedron is a parallelepiped.

22. A rendering apparatus to perform volume rendering via texture mapping for a bounding volume, comprising:

means for ordering a plurality of vertices of the bounding volume;

means for ordering a plurality of edges of the bounding volume based on the ordering of the plurality of vertices;

means for identifying a plurality of slabs, based on relative positions of the plurality of vertices;

means for identifying a plurality of active edges for each slab, wherein an active edge is an edge from the plurality of edges that is intersected by the slab;

means for ordering a plurality of vertices of a z polygon, wherein a vertex of a z polygon is defined by an intersection of an active edge and a view-plane-aligned plane in a slab;

means for rendering a plurality of edges of a z polygon, wherein an edge connects two consecutively ordered vertices of the z polygon; and means for performing volume rendering by rendering a series of z polygons, wherein the means for rendering an edge of a z polygon resulting from a view-plane-aligned plane intersecting a parallelepiped requires three multiplications, two additions, and one subtraction.

23. The apparatus of claim 22, wherein the bounding volume is a parallelepiped and wherein the means for ordering a plurality of vertices for the parallelepiped with eight vertices orders the vertices such that the parallelepiped is in one of a first orientation and a second orientation.

24. The apparatus of claim 23, wherein the means for ordering a plurality of vertices for the parallelepiped orders the vertices in the first orientation such that a fourth vertex has a smaller z depth than a fifth vertex.

25. The apparatus of claim 23, wherein the means for ordering a plurality of vertices for the parallelepiped orders the vertices in the second orientation such that a fourth vertex has a greater z depth than a fifth vertex.

26. The apparatus of claim 22, wherein the means for ordering a plurality of edges for a parallelepiped with twelve edges orders the plurality of edges by numbering the edges in either a clockwise direction or a counterclockwise direction when viewed along an axis connecting a vertex with a smallest z depth to a vertex with a greatest z depth.

27. The apparatus of claim 22, wherein the means for identifying a plurality of slabs for a parallelepiped with seven slabs intersecting the parallelepiped identifies the plurality of slabs from a slab with a smallest z depth to a slab with a largest z depth.

28. The apparatus of claim 22, wherein the means for ordering a plurality of active edges for each slab orders the plurality of edges based on the ordering of edges that are intersected by a view-plane-aligned plane in the slab.

29. The apparatus of claim 28, wherein the number of active edges for seven slabs of increasing depth for a parallelepiped in a first orientation is three, four, five, six, five, four, three, respectively.

30. The apparatus of claim 28, wherein the number of active edges for seven slabs of increasing depth for a parallelepiped in a second orientation is three, four, five, four, five, four, three, respectively.

31. A display apparatus for displaying a bounding volume, comprising:

a memory for storing data representing the bounding volume;

a processor coupled to the memory for performing operations to generate data for display of the bounding volume; and a graphics adapter coupled to the processor for causing the bounding volume to be displayed, wherein the processor:

determines an ordered set of vertices of the bounding volume based of the data stored in the memory, determines an ordered set of edges of the bounding volume based on the ordered set of vertices, identifies a plurality of slabs based on relative positions of the ordered set of vertices, generates a sequence of z polygons based on intersections of the bounding volume with a s of view-plane-aligned planes in the slabs, and instructs the graphics adapter to display the bounding volume based on volume rendering by displaying the sequence of z polygons, wherein the processor generates the sequence of z polygons by rendering a plurality of edges of the z polygons resulting from the sequence of view-plane-aligned planes intersecting the bounding volume, and wherein rendering each edge of the z polygons requires three multiplications, two additions, and one subtraction.

32. The computer of claim 31, wherein the bounding volume displayed is a convex polyhedron.

33. The computer of claim 32, wherein the convex polyhedron is a parallelepiped.

34. A computer program product on a computer-readable medium for volume rendering via texture mapping for a bounding volume, the computer program product comprising:

instructions for ordering a plurality of vertices of the bounding volume;

instructions for ordering a plurality of edges of the bounding volume based on the ordering of the plurality of vertices;

instructions for identifying a plurality of slabs, based on relative positions of the plurality of vertices;

instructions for identifying a plurality of active edges for each slab, wherein an active edge is an edge from the plurality of edges that is intersected by the slab;

instructions for ordering a plurality of vertices of a z polygon, wherein a vertex of a z polygon is defined by an intersection of an active edge and a view-plane-aligned plane in a slab;

instructions for rendering a plurality of edges of a z polygon, wherein an edge connects two consecutively ordered vertices of the z polygon; and instructions for performing volume rendering by rendering a series of z polygons, wherein the instructions for rendering a plurality of edges of a z polygon requires three multiplications, two additions, and one subtraction for each edge.

35. The computer program product of claim 34, wherein the bounding volume is a convex polyhedron.

36. The computer program product of claim 35, wherein the convex polyhedron is a parallelepiped.

* * * * *

UNITED STATES PATENT AND TRADEMARK OFFICE
CERTIFICATE OF CORRECTION

| | | |
|---|---|---|
| PATENT NO. | : 6,628,281 B1 | Page 1 of 1 |
| APPLICATION NO. | : 09/513817 | |
| DATED | : September 30, 2003 | |
| INVENTOR(S) | : Fossum et al. | |

It is certified that error appears in the above-identified patent and that said Letters Patent is hereby corrected as shown below:

Col. 14, line 45: after "volume with a" delete "s" and insert --sequence--.

Signed and Sealed this

Twenty-seventh Day of March, 2007

JON W. DUDAS
*Director of the United States Patent and Trademark Office*